US008446025B2

(12) United States Patent
Andoh

(10) Patent No.: US 8,446,025 B2
(45) Date of Patent: May 21, 2013

(54) BIAXIAL TYPE OF STARTER FOR STARTING INTERNAL COMBUSTION ENGINE

(75) Inventor: Kazuhiro Andoh, Okazaki (JP)

(73) Assignee: Denso Corporation, Kariya (JP)

( * ) Notice: Subject to any disclaimer, the term of this patent is extended or adjusted under 35 U.S.C. 154(b) by 601 days.

(21) Appl. No.: 12/219,514

(22) Filed: Jul. 23, 2008

(65) Prior Publication Data

US 2009/0027147 A1 Jan. 29, 2009

(30) Foreign Application Priority Data

Jul. 24, 2007 (JP) ................................ 2007-192442

(51) Int. Cl.
*F02N 11/00* (2006.01)
*H01H 67/02* (2006.01)
*H02K 11/00* (2006.01)

(52) U.S. Cl.
USPC ............................ 290/38 R; 335/126; 310/71

(58) Field of Classification Search
USPC .................. 335/126, 196; 310/71; 290/38 R; 74/7 A–7 C
See application file for complete search history.

(56) References Cited

U.S. PATENT DOCUMENTS 2,774,894 A * 12/1956 Antonidis et al. .............. 310/71
4,104,550 A * 8/1978 Penhorwood .................. 310/71
4,488,054 A * 12/1984 Ebihara ....................... 290/38 A
4,631,434 A * 12/1986 Asaoka et al. ................ 310/112
4,732,120 A 3/1988 Naito et al.
5,494,010 A * 2/1996 Niimi et al. .............. 123/179.25
5,622,148 A * 4/1997 Xue et al. ................. 123/179.25
6,229,416 B1 5/2001 Ebihara et al.
6,404,310 B1 6/2002 Ando et al.
6,965,172 B2 * 11/2005 Shimoyama et al. ....... 290/38 A
7,034,643 B1 * 4/2006 Kusumoto et al. ............ 335/126
7,038,564 B1 * 5/2006 Kusumoto et al. ............ 335/126
7,067,934 B2 * 6/2006 Kitagawa et al. ........... 290/38 R (Continued)

FOREIGN PATENT DOCUMENTS

CN 1607328 A 4/2005
GB 2 126 422 A 3/1984

(Continued)

OTHER PUBLICATIONS

Search Report issued May 27, 2010 in European Patent Application No. EP 08 01 3289.7.

(Continued)

*Primary Examiner* — Tran Nguyen
*Assistant Examiner* — Thomas Truong
(74) *Attorney, Agent, or Firm* — Oliff & Berridge, PLC

(57) ABSTRACT

A starter for starting in-vehicle internal combustion engines comprise a motor, an electromagnetic switch and an electrically conductive connection member. The electromagnetic switch comprises first and second fixed contacts, a movable contact, an electromagnet moving back and forth to the movable contact to electrically connect and disconnect the first and second fixed contacts, and a cover covering the first and second contacts and movable contact. The predetermined direction is parallel to an armature provided in the motor. The electromagnet is provided with only a single coil generating a drive force for moving the movable contact. A connection member is arranged to be through the casing and the cover and electrically connects a brush of the armature in the motor and the second fixed contact in the switch. The connection member includes an end part arranged in the casing of the switch. This end part functionally provides the second fixed contact.

27 Claims, 6 Drawing Sheets

U.S. PATENT DOCUMENTS

| | | | | |
|---|---|---|---|---|
| 7,626,280 | B2 * | 12/2009 | Kurasawa et al. | 290/38 R |
| 7,772,944 | B2 * | 8/2010 | Kurasawa et al. | 335/126 |
| 2004/0020315 | A1 * | 2/2004 | Vilou et al. | 74/7 A |
| 2006/0201266 | A1 | 9/2006 | Kajino et al. | |
| 2008/0024253 | A1 | 1/2008 | Kurasawa et al. | |
| 2008/0048454 | A1 | 2/2008 | Kurasawa et al. | |

FOREIGN PATENT DOCUMENTS

| | | |
|---|---|---|
| JP | B2-6-33749 | 5/1994 |
| JP | A-2001-155609 | 6/2001 |
| JP | B2-3478211 | 10/2003 |
| JP | A-2006-233930 | 9/2006 |
| JP | A-2008-25364 | 2/2008 |
| JP | A-2008-88965 | 4/2008 |

OTHER PUBLICATIONS

Chinese Office Action dated Aug. 22, 2011 for Chinese Patent Application No. 2008101350168 (with translation).

* cited by examiner

BIAXIAL TYPE OF STARTER FOR STARTING INTERNAL COMBUSTION ENGINE

CROSS-REFERENCE TO RELATED APPLICATION

This application is based on and claims the benefit of priority from earlier Japanese Patent Application No. 2007-192442 filed Jul. 24, 2007, the description of which is incorporated herein by reference.

BACKGROUND OF THE INVENTION

1. Technical Field of the Invention

The present invention relates to a biaxial type of starter for starting internal combustion engines, and in particular, to such a starter in which the operative shaft of an electromagnetic switch and the armature shaft of a motor are disposed parallel to each other.

2. Related Art

Japanese Patent No. 3478211, for example, discloses a starter including: a main contact which is provided in a motor circuit for supplying current from batteries to the armature of the motor; and an electromagnetic switch for opening/closing the main contact.

The main contact consists of a B (i.e., battery)-fixed-contact connected to a high-potential side (battery side) of the motor circuit via a B-terminal bolt, an M-fixed-contact connected to a low-potential side (motor side) of the motor circuit via an M (i.e., motor)-terminal bolt, and a movable contact configured to move over against the B-fixed contact and the M-fixed contact. The movable contact comes into contact with both of the fixed contacts to make both of the fixed contacts electrically conductive and to thereby close the main contact. When both of the fixed contacts are apart from the movable contact and the electrical conduction is interrupted between these fixed contacts, the main contact is opened.

However, starters of the type mentioned above use a number of parts on the low-potential side of the motor circuit. In particular, other than the M-fixed contact, such a type of starter needs, for example, an M-terminal bolt to be fixed to an insulating contact cover of the electromagnetic switch, a sealing member (e.g., O-ring) for sealing a gap between the M-terminal bolt and the contact cover, a washer for fixing the M-terminal bolt to the contact cover, motor leads drawn from the side of the motor, and nuts for fixing the terminals of the respective motor leads to the M-terminal bolt. In this way, the number of parts is increased and thus the number of assembling processes is increased, producing factors of high cost.

In addition, since two terminal bolts (B- and M-terminal bolts) are radially juxtaposed in the electromagnetic switch, an insulation distance (creepage distance) is required to be ensured between the two terminal bolts. Under such conditions, there is a limitation in radially closely arranging the two terminal bolts, and this has prevented the downsizing (radial reduction) of such an electromagnetic switch.

SUMMARY OF THE INVENTION

The present invention has been made in light of the circumstances provided above, and has as its object to provide a starter which is able to reduce cost by reducing the number of parts and thus to reduce the size of an electromagnetic switch, and to provide a method for manufacturing such a starter.

For the above object, the present invention provides a starter for starting an internal combustion engine of a vehicle, comprises an electric motor, an electromagnetic switch, and an electrically conductive connection member. The electric motor is provided with an armature, a brush, and a casing that encloses at least the armature and the brush, current being supplied to the armature via the brush. The electromagnetic switch is provided with first and second fixed contacts, a movable contact, an electromagnet that moves back and forth to the movable contact in a predetermined direction so as to electrically connect and disconnect the first and second fixed contacts, and a cover that covers at least the first and second contacts and the movable contact. The predetermined direction is parallel to a longitudinal direction of the armature of the motor. The electromagnet is provided with only a single coil generating a drive force for moving the movable contact. The electrically conductive connection member is arranged to link the motor and the electromagnetic switch through the casing of the motor and the cover of the electromagnetic switch and electrically connects the brush of the motor and the second fixed contact in the electromagnetic switch. The connection member includes an end part arranged in the casing of the electromagnetic switch, and this end part of the connection member functionally provides the second fixed contact.

With the above configuration, one end part of the connection member is connected to, for example, a pigtail of a plus-side brush, and the other end part of the connection member functionally forms the second fixed contact. Thus, various parts can be omitted, such as the conventional terminal bolt (called M-terminal bolt), sealing members, washer, motor leads and nuts, by which the number of assembling processes can be reduced.

Also, the omission of the conventional terminal bolt can reduce the number of terminal bolts to one to establish connection with the motor circuit. In other words, only one terminal bolt may only have to be fixed to the contact cover in order to connect the first fixed contact (called B-fixed contact) to the high-potential side of the motor circuit. In this case, a large insulation distance (creepage distance) can be ensured between the connection member forming the second fixed contact (called M-fixed contact) and the single terminal bolt, because the connection member is inserted into the cover from the radial outer periphery thereof. As a result, the diameter of the cover can be reduced comparing with the conventional electromagnetic switch where two terminal bolts are juxtaposed along the radial direction of the cover.

Moreover, in a conventional two-coil electromagnetic switch, or in an electromagnetic switch having a suction coil and a retention coil, electrical connection is generally established between the suction coil and an M-terminal bolt via a connecting terminal. Accordingly, the omission of the M-terminal bolt may involve substantial structural change, for establishing connection between the suction coil and the motor circuit. In this regard, in the present invention, the switch coil of the electromagnetic switch is not required to be connected to the motor circuit, because the switch coil is structured by a single coil. In other words, the omission of the M-terminal bolt may cause no problem, and thus almost no structural change is required. Accordingly, the connecting terminal can be omitted together with the omission of the M-terminal bolt, and hence the process can also be omitted for connecting the end of the suction terminal to the connecting terminal such as by welding, whereby the number of parts and the number of processes can be reduced and thus more cost reduction can be achieved.

It is preferred that the starter comprises a holding member (28) that is made of insulating and elastic material and that fixedly holds, between the motor and the electromagnetic switch, the connection member inserted through the holding member and that is inserted through the casing of the motor and the cover of the electromagnetic switch.

In this way, the connection member is held and supported by the holding member, so that the starter can be assembled in the state where the connection member is fitted to the side of the electromagnetic switch through the holding member. In this case, since one end side of the connection member has already been inserted into the cover to form the second fixed contact, the starter can be assembled by only connecting the other end side of the contact member to the brush.

DETAILED DESCRIPTION OF THE PREFERRED EMBODIMENTS

Hereinafter will be described in detail some embodiments of the present invention.

(First Embodiment)

Referring to FIGS. 1-4, a first embodiment of the present invention will now be described.

Figure 1:
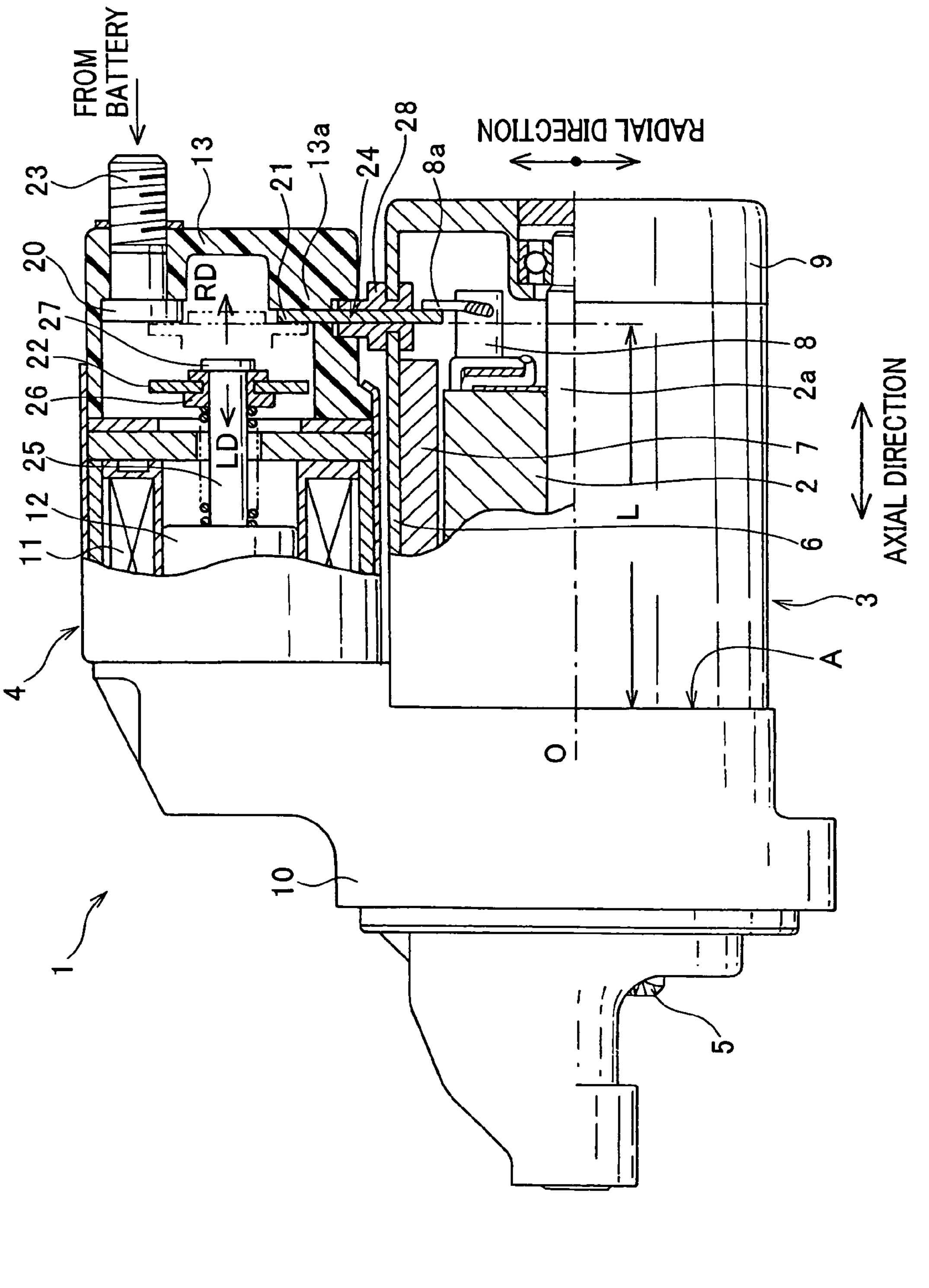
FIG. 1 is a side elevational view with a partial cross section illustrating a starter according to a first embodiment of the present invention.
Figure 2A:
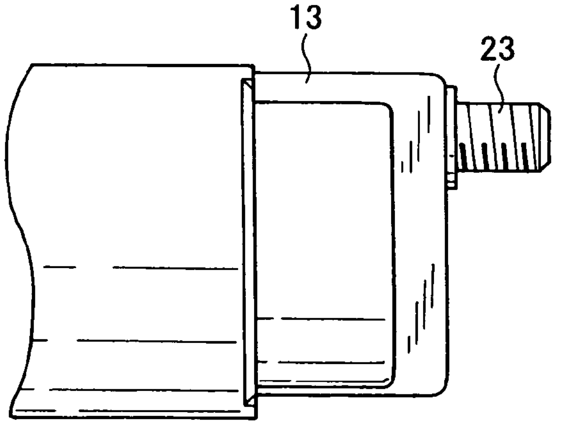
FIG. 2A is a side elevational view illustrating a contact cover according to the first embodiment.
Figure 2B:
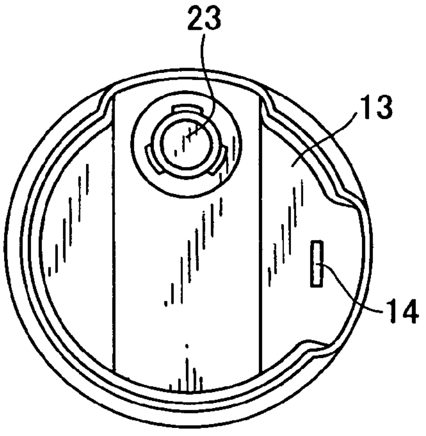
FIG. 2B is a front elevational view illustrating the contact cover as viewed from the axial direction, according to the first embodiment.
Figure 3:
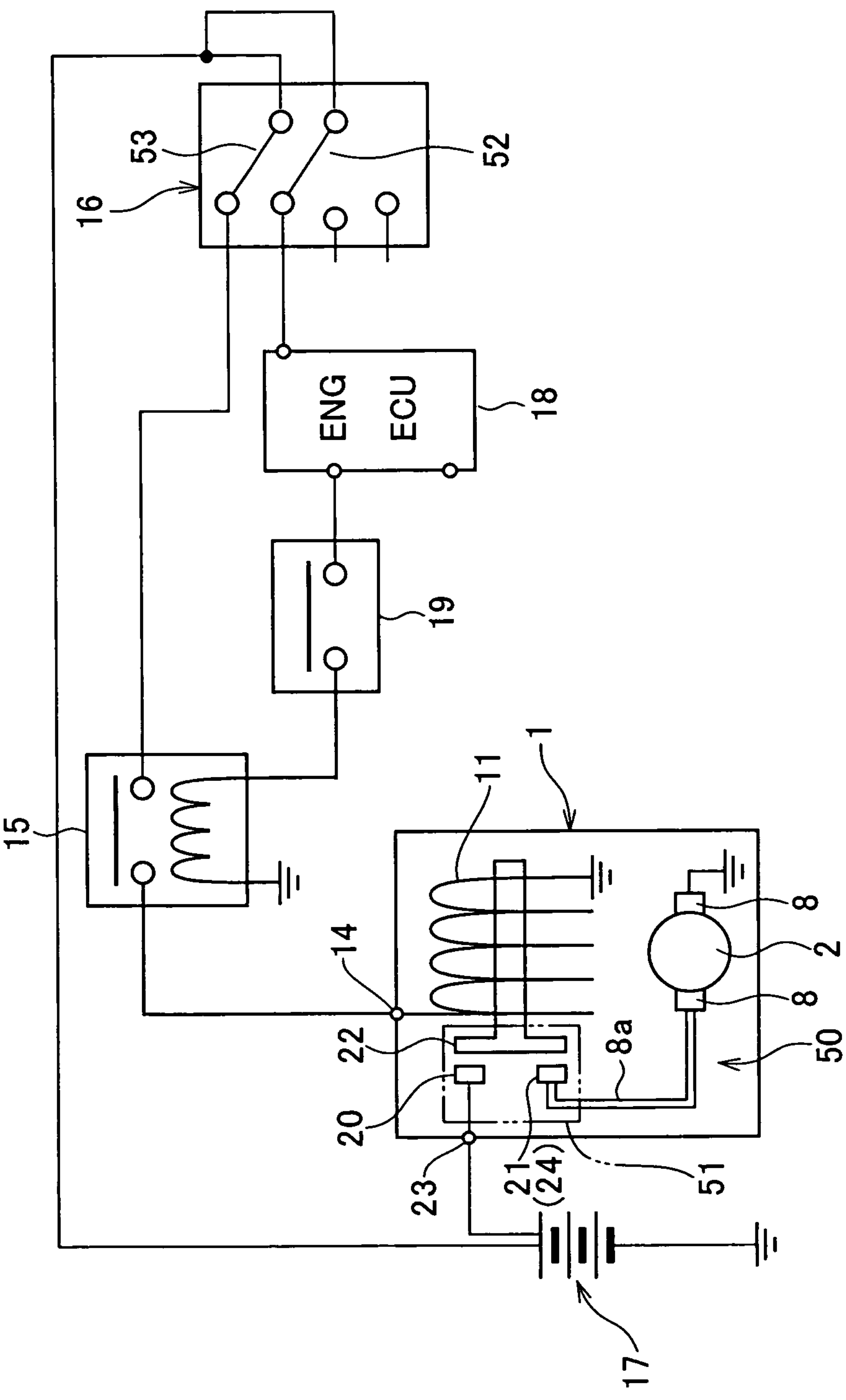
FIG. 3 illustrates a starting circuit diagram of the starter according to the first embodiment.

As shown in FIGS. 1-3, a starter 1 according to the first embodiment is provided. This starter 1, which is to be mounted on a vehicle, is provided with an armature 2 having an armature shaft 2*a*; a motor 3 for generating torque for the armature 2; a motor circuit 50 for supplying current to the armature 2; a main contact 51 (described later) provided in the motor circuit 50; an electromagnetic switch 4 for opening/dosing the main contact 51; an output shaft (not shown) that rotates with the transmission of the driving torque from the motor 3; and a pinion gear 5 helical-spline-fitted to the outer periphery of the output shaft.

In the present embodiment, as shown in FIG. 1, the longitudinal direction along the output shaft, that is, the longitudinal direction along the armature 2 is defined as an axial direction and directions along a plane perpendicular to the axial direction are referred to as a radial direction.

The starter 1 has a well-known function of starting an engine by bringing the pinion gear 5 into engagement with a ring gear (not shown) of the engine, and transmitting the driving torque of the motor 3 to the engine through the pinion gear 5 and the ring gear.

The motor 3 includes: a cylindrical yoke 6 forming a magnetic circuit; field permanent magnets 7 (or field coils) fixed to the inner periphery of the yoke; the armature 2 having gaps and rotatably supported by the inner periphery of the permanent magnets; a brush 8 for passing current to the armature 2 through a rectifier provided at the armature 2; and an end frame 9 fitted to the rear-end opening of the yoke 6. The "rear-end" side means the rightward side in FIG. 1. The motor 3 is fixed to and clamped on a housing 10 through a through bolt, not shown.

The electromagnetic switch 4 has a function of actuating (sucking or attracting) a plunger 12 with the magnetic force generated by a switch coil 11 to open/close the main contact 51, and at the same time pushing the pinion gear 5 to the direction opposite to the motor (leftward in FIG. 1) through a shift lever (not shown). As shown in FIG. 1, the electromagnetic switch 4 is fixed to the housing 10 so as to be close to the radial outer periphery of the motor 3. The operative shaft of the plunger 12 is disposed parallel to a longitudinal direction O (i.e., axial direction) of the armature shaft of the motor 3.

A switch coil 11 is made up of a single coil electrically separated from the motor circuit 50, which coil has one end portion connected to a terminal 14 (which is frequently referred to as a "50-terminal": see FIG. 2B) which is fixed to an insulating contact cover 13 of the electromagnetic switch 4, and the other end portion connected to a grounding side. Specifically, the single switch coil 11 generates suction force for sucking the plunger 12 for closing operation of the main contact 51, and retention force for retaining the plunger 12 to maintain the closed state.

As shown in FIG. 3, the terminal 14 is connected to an ignition switch 16 (hereinafter referred to an "IG switch") via a starter relay 15. When the IG switch 16 is turned on, current flowing from batteries 17 is supplied via the starter relay 15.

As shown in FIG. 3, the IG switch 16 is configured to have two systems, that is: a relay circuit 52 for controlling the excitation current of the starter relay 15 by an ECU (electronic control unit) 18; and a terminal circuit 53 for supplying current flowing from the batteries 17 to the terminal 14 via the starter relay 15. A neutral switch 19 is provided at the relay circuit 52 so that the shift position of the transmission, when it is neutral, can be brought into an on-state. When the IG switch 16 is turned with the neutral switch 19 being in an on-state, the excitation current is supplied to the starter relay 15 via the ECU 18 to close the relay contact.

The main contact 51 includes a B-fixed contact 20 connected to a high-potential side (battery side) of the motor circuit 50, an M-fixed contact 21 connected to a low-potential side (motor side) of the motor circuit 50, and a movable contact 22 for connecting/disconnecting the fixed contacts 20 and 21. When the movable contact 22 comes into contact with the fixed contacts 20 and 21, and the contacts 20 and 21 are electrically connected, the main contact 51 is in a closed state. When the movable contact 22 is apart from the fixed contacts 20, and 21 and the contacts 20 and 21 are disconnected, the main contact 51 is in an opened state.

The B-fixed contact 20 is arranged in the contact cover 13 and integrated into a B-terminal bolt 23 which is molded and fixed onto the contact cover 13 of the electromagnetic switch 4.

The B-terminal bolt 23 is axially projected from the rear-end surface of the contact cover 13. A battery cable 54 is electrically connected to the tip end of the projected B-terminal bolt 23.

Figure 5:
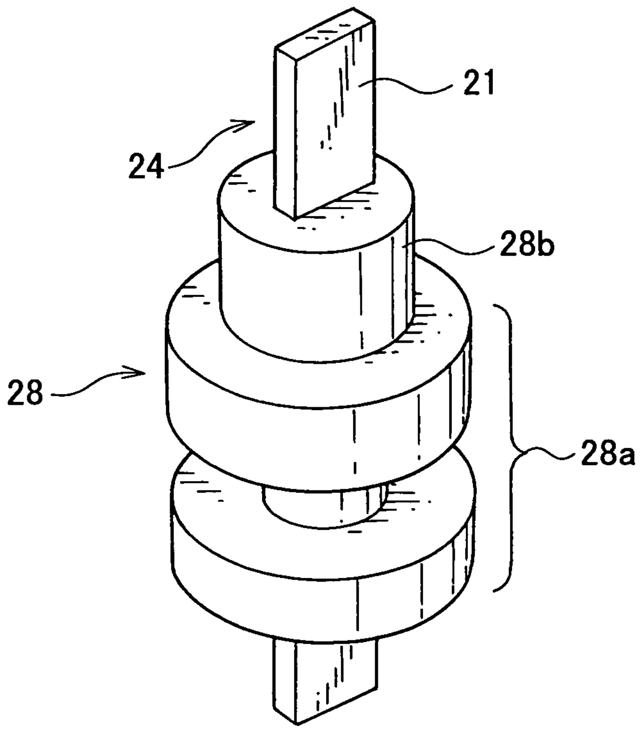
FIG. 5 is a perspective view illustrating a metal terminal and a rubber grommet used in the embodiment.

The M-fixed contact 21, which is a portion of a metal terminal 24 having electrical conductivity, is connected to a pigtail 8*a* of the plus-side brush 8 via the metal terminal 24. The metal terminal 24 has a strip shape as can be seen in FIG. 5.

Incidentally, the shape of the metal terminal 24 is not always limited to a strip shape, i.e., a flat plate form, but may be modified such that only both ends thereof are formed-into flat plate portions and the remaining portion thereof is formed into a cylindrical shape, for example.

The movable contact 22 is attached to an end of a shaft 25 via an insulating member 26, as shown in FIG. 1, and is prevented from coming off, with the aid of a washer 27 fixed to the end of the shaft 25. The shaft 25 is fixed to the plunger 12 which is slidably provided in the electromagnetic switch 4.

Hereinafter is provided a detailed explanation on the metal terminal 24.

The metal terminal 24 is made, for example, of a copper plate and inserted into a slit hole 28*c* formed in a rubber grommet 28 (functioning as an elastic member having insulation properties). Lateral sides of the metal terminal 24 in the longitudinal direction are held by the grommet 28 in the state of being projected from the slit hole 28*c*.

One end side of the metal terminal 24 is inserted into the motor 3 from an opening formed between the yoke 6 and the end frame 9 of the motor 3 (hereinafter referred to a "motor-side opening"), and electrically connected to the pigtail 8*a* of the plus-side brush 8. The other end side of the metal terminal 24 is inserted into the contact cover 13 of the electromagnetic switch 4 from an opening formed in the contact cover 13 (hereinafter referred to a "switch-side opening") and forms the M-fixed contact 21.

Figure 4:
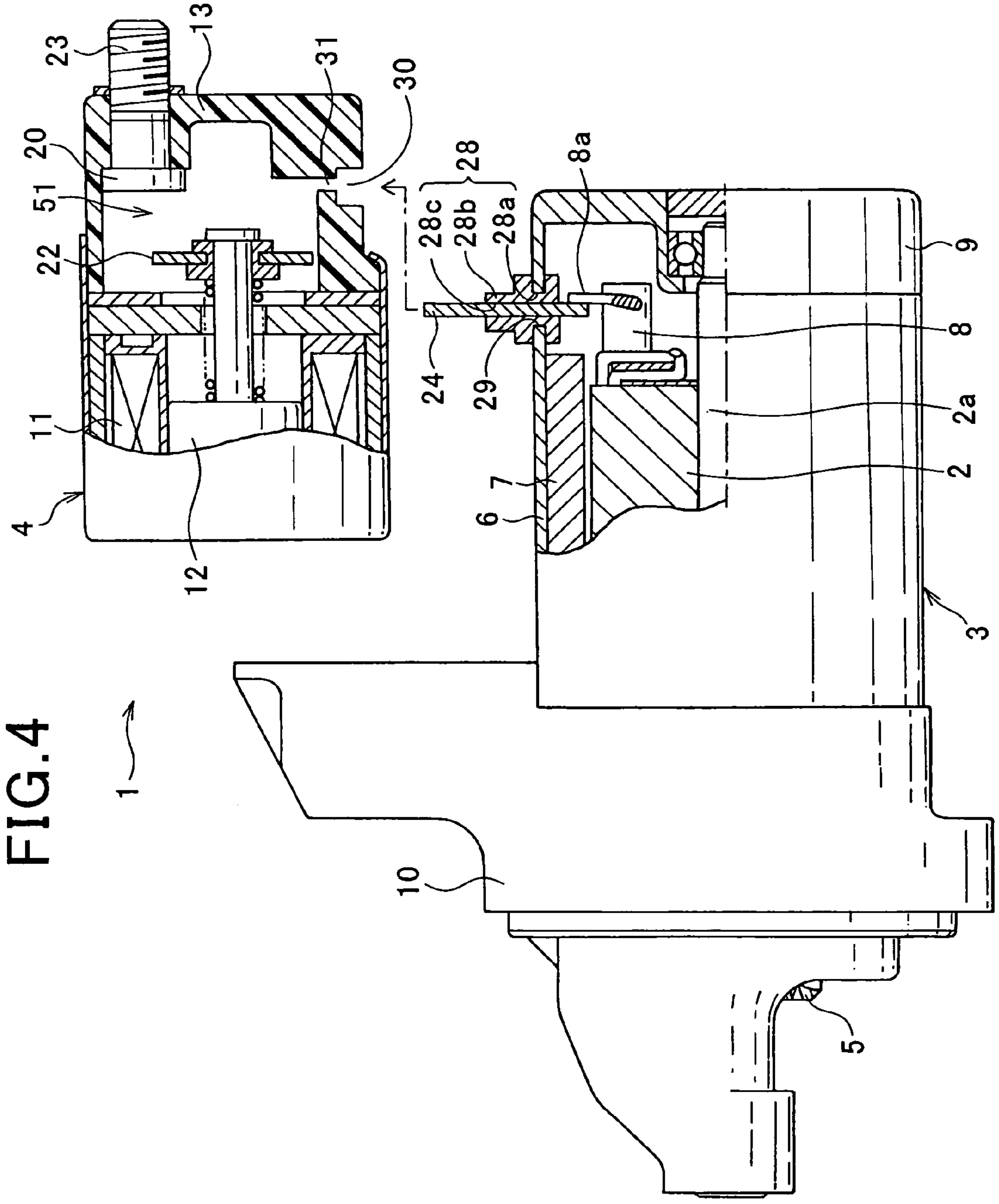
FIG. 4 is a cross-sectional view illustrating the procedure of assembling a starter ASSY, according to the first embodiment.

As shown in FIG. 4, the grommet 28 is provided with a motor-side seal 28*a* for sealing the motor-side opening and a switch-side seal 28*b* for sealing the switch-side opening. Both seals 28*a* and 28*b* are integrally formed.

The motor-side opening is formed, for example, of a substantially U-shaped groove 29 (see FIG. 4; in detail, see FIG. 6) which is formed in an opening end of the yoke 6. The motor-side seal 28*a* of the grommet 28 is fitted to the groove 29, and then the end frame 9 is assembled to the opening end of the yoke 6. Thus, the motor-side seal 28*a* is held between the yoke 6 and the end frame 9.

The switch-side opening is formed of a recess 30 to which the switch-side seal 28*b* of the grommet 28 is elastically fitted, and a through hole 31 passing through the contact cover 13 from the recess 30 to the inside of the cover 13. The end side of the metal terminal 24 projecting from the switch-side seal 28*b* is inserted into the contact cover 13 through the through hole 31.

The motor-side opening (U-shaped groove 29) and the switch-side opening (recess 30 and through hole 31) are formed at such positions that the axial distances L from a motor-mount surface A (see FIG. 1) of the housing 10 for fixing the motor 3 to these positions are substantially the same.

As shown in FIG. 4, the grommet 28 of the present embodiment is attached to the side of the motor in the state where the motor-side seal 28*a* is fitted to the motor-side opening. Then, when a starter ASSY is assembled by fixing the motor 3 and the electromagnetic switch 4 to the housing 10, the switch-side seal 28*b* is elastically fitted to the recess 30 formed in the contact cover 13 to seal the switch-side opening. Thus, the waterproof is ensured for the motor 3 and the electromagnetic switch 4.

Prior to sandwiching the motor-side seal 28 of the grommet 28 between the yoke 6 and the end frame 9, that is, prior to assembling the end frame 9 to the rear end of the yoke 6, one end of the metal terminal 24 is electrically connected, by welding, for example, to the pigtail 8*a* of the plus-side brush 8. Then, in assembling the starter ASSY, the other end side of the metal terminal 24 is inserted into the contact cover 13 from the switch-side opening to thereby form the M-fixed contact 21. In this case, the M-fixed contact 21 is held by the grommet 28 in the state of being pressed onto an insulating contact seat 13*a* (see FIG. 1) provided at the contact cover 13. In other words, the grommet 28 is assembled with its switch-side seal 28*b* being elastically fitted to the recess 30 of the contact cover 13, in the state where the other end side of the metal terminal 24 forming the M-fixed contact 21 is pressed onto the contact seat 13*a*.

Hereinafter, the operation of the electromagnetic switch 4 is explained.

When the IG switch 16 is turned on to supply current to the switch coil 11 of the electromagnetic switch 4, the plunger 12, being sucked by the magnetic force generated by the switch coil 11, is shifted rightward RD of FIG. 1. Thus, the shaft 25 fixed to the plunger 12 is pushed out, and the movable contact 22 supported at the end of the shaft 25 is permitted to come into contact with the B-fixed contact 20 and the M-fixed contact 21 to close the main contact 51. As a result, current is supplied from the batteries 17 to the armature 2 via the brush 8 to generate torque in the armature 2.

After the engine start, when the IG switch 16 is turned off to stop the current supply to the switch coil 11 for elimination of the magnetic force, the plunger 12 is pushed back to the leftward LD by the reaction force of a return spring (not shown). Then, the movable contact 22 comes away from the B-fixed contact 20 and the M-fixed contact 21 to open the main contact 51, whereby the current supply to the motor 3 is stopped.

The electromagnetic switch 4 of the present embodiment establishes direct connection between the metal terminal 24 forming the M-fixed contact 21 and the pigtail 8*a* of the plus-side brush 8. This can omit use of the conventional M-terminal bolt, and accordingly, various parts can also be omitted, such as sealing members, washer, motor leads and nuts. In this way, the number of parts and the number of assembling processes can be reduced, whereby cost, size and weight can be reduced.

Also, the omission of the conventional M-terminal bolt can reduce the number of terminal bolts to one to establish connection with the motor circuit 50. In other words, only one B-terminal bolt 23 may only have to be fixed to the contact cover 13 (see FIG. 2) in order to connect the B-fixed contact 20 to the high-potential side of the motor circuit 50. In this case, a large insulation distance (creepage distance) can be ensured between the metal terminal 24 forming the M-fixed contact 21 and the B-terminal bolt 23, because the metal terminal 24 is inserted into the contact cover 13 from the radial outer periphery of the contact cover 13. As a result, the diameter of the contact cover 13 can be reduced comparing with the conventional electromagnetic switch where two terminal bolts are juxtaposed along the radial direction of the contact cover.

Moreover, in a conventional two-coil electromagnetic switch, or in an electromagnetic switch having a suction coil and a retention coil, electrical connection is generally established between the suction coil and an M-terminal bolt via a connecting terminal. Accordingly, the omission of the M-terminal bolt may involve substantial structural change, for establishing connection between the suction coil and the motor circuit 50. In this regard, owing to the starter 1 of the present embodiment, the switch coil 11 of the electromagnetic switch 4 can be electrically disconnected from the motor circuit 50, because the switch coil 11 is structured by a single coil. In other words, the omission of the M-terminal bolt may cause no problem, and thus no structural change is required. Accordingly, the connecting terminal can be omitted together with the omission of the M-terminal bolt, and hence the process can also be omitted for connecting the end of the suction terminal to the connecting terminal such as by welding, whereby more cost down can be achieved.

Also, since the metal terminal 24 is held by the rubber grommet 28, relative vibration between the motor 3 and the electromagnetic switch 4 caused by engine vibration can be absorbed by the grommet 28. Accordingly, the stress applied to the metal terminal 24 can be mitigated.

In addition, the grommet 28 is provided with the motor-side seal 28*a* for sealing the motor-side opening and the switch-side seal 28*b* for sealing the switch-side opening, and thus both of the motor-side and switch-side openings can be reliably sealed to ensure waterproof of the motor 3 and the electromagnetic switch 4.

Further, the motor-side and switch-side openings are formed at the positions so that the axial distances from the motor-mount surface A of the housing 10 to the positions are substantially the same. Thus, in assembling the starter ASSY, the end side of the metal terminal 24 can be readily inserted into the contact cover 13 from the switch-side opening.

The metal terminal 24 held by the grommet 28 is fixed, with the end side of the terminal 24 that forms the M-fixed contact 21 being pressed onto the contact seat 13*a*. Thus, when the movable contact 22 comes into contact with the M-fixed contact 21, the M-fixed contact 21 will not move (will not vibrate). In this way, stable contact can be attained between the M-fixed contact 21 and the movable contact 22, thereby preventing contact failure between the movable contact 22 and the M-fixed contact 21.

The metal terminal 24 can be readily manufactured by forming a simple plate by presswork, for example.

Also, the connection between the pigtail 8*a* of the plus-side brush 8 and one end side of the metal terminal 24 can be readily attained because the pigtail 8*a* can be connected to the plane surface of the metal terminal 24. Further, by permitting the thickness direction of the metal terminal 24 to coincide with the axial direction of the starter 1 (left-right direction of FIG. 1), the axial direction of the starter 1 can be shortened.

(Second Embodiment)

Figure 6:
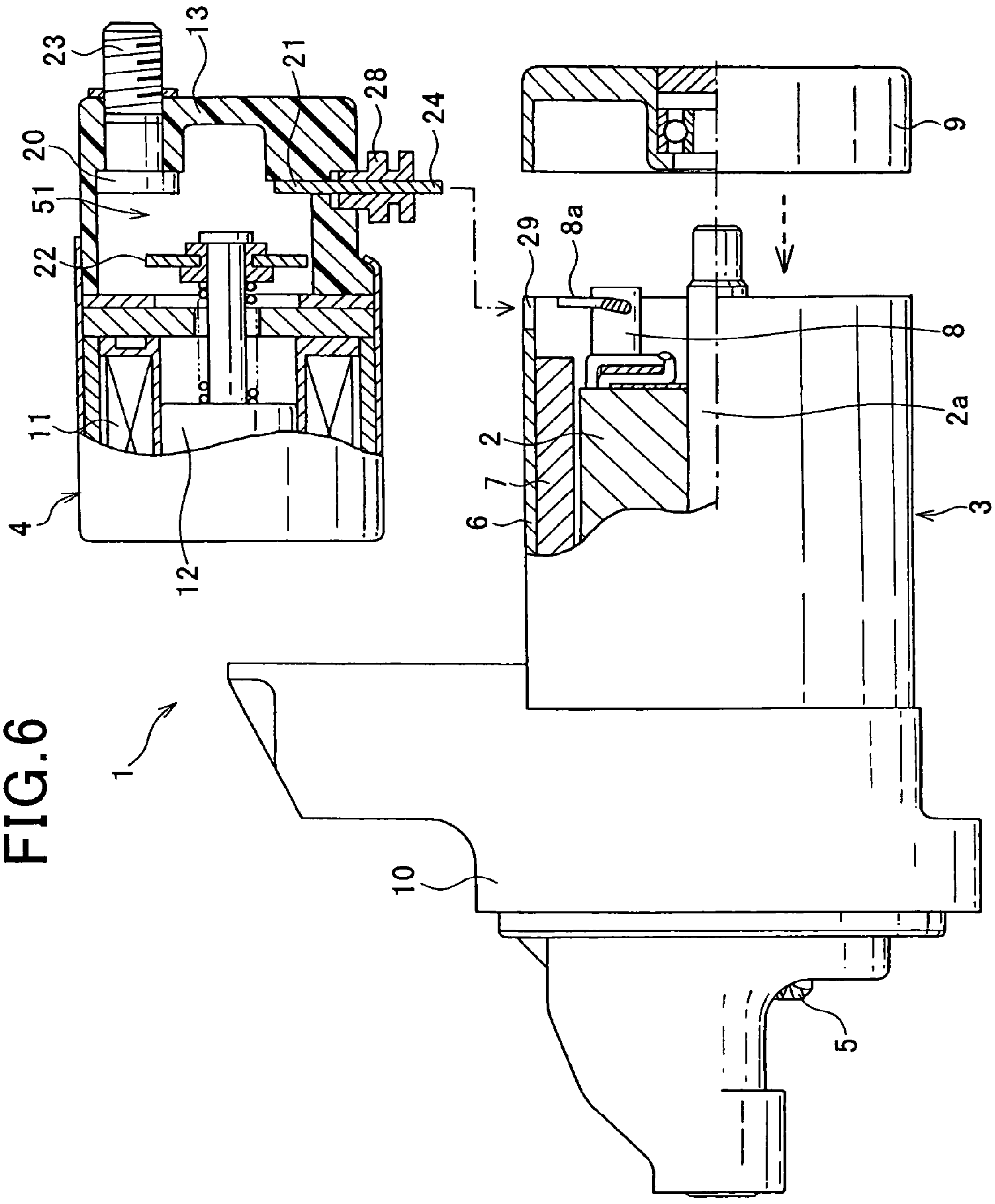
FIG. 6 is a cross-sectional view illustrating the procedure of assembling a starter ASSY, according to a second embodiment of the present invention.

Referring to FIG. 6, a second embodiment of the present invention will now be described.

In the present embodiment, the identical or similar components to those in the firs embodiment are given the same reference numerals for the sake of omitting explanation.

The second embodiment is directed to how to assembling the starter in steps modified from those in the first embodiment. FIG. 6 is a cross-sectional view illustrating another procedure for assembling the starter ASSY.

The present embodiment presents an example in which the starter ASSY is assembled in the state where the metal terminal 24 held by the grommet 28 is attached to the side of the switch.

In the first embodiment, the starter ASSY has been assembled in the state where the metal terminal 24 held by the grommet 28 is attached to the side of the motor. Alternatively, as shown in FIG. 6, for example, the metal terminal 24 held by the grommet 28 may be attached to the side of the switch in advance, and then, in assembling the starter ASSY, an end side of the metal terminal 24 may be connected to the pigtail 8*a* of the plus-side brush 8. After that, the end frame 9 may be assembled to the yoke 6 to sandwich the motor-side seal 28*a* of the grommet 28 between the yoke 6 and the end frame 9, for fixation.

In this case, since one end of the metal terminal has already been connected to the pigtail of the plus-side brush, the assemblage of the starter ASSY can be attained by only inserting the other end side of the metal terminal into the contact cover from the opening formed in the contact cover.

The present invention may be embodied in several other forms without departing from the spirit thereof. The embodiment and modification described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A starter for starting an internal combustion engine of a vehicle, comprising:

an electric motor provided with an armature, a brush, and a casing that encloses at least the armature and the brush, current being supplied to the armature via a motor circuit;

an electromagnetic switch provided with first and second fixed contacts, a movable contact, an electromagnet that moves back and forth to the movable contact in a predetermined direction so as to electrically connect and disconnect the first and second fixed contacts, and a cover that covers at least the first and second contacts and the movable contact, the predetermined direction being parallel to a longitudinal direction of the armature of the motor, the electromagnet being provided with only a single coil generating a drive force for moving the movable contact;

an electrically conductive connection member that is arranged to link the motor and the electromagnetic switch through the casing of the motor and the cover of the electromagnetic switch and electrically connects the brush of the motor and the second fixed contact in the electromagnetic switch, the connection member including an end part arranged in the cover of the electromagnetic switch, the end part of the connection member functionally providing the second fixed contact, the single coil has one end portion connected to a terminal which is fixed to the cover of the electromagnetic switch, and an other end portion connected to a grounding side, such that the single coil is electrically separated from the motor circuit; and a holding member that is made of insulating and elastic material and that fixedly holds, between the motor and the electromagnetic switch, the connection member inserted through the holding member and that is inserted through the casing of the motor and the cover of the electromagnetic switch, wherein:

the connection member penetrates the casing at a part of the casing that is substantially perpendicular to an elongating direction of the connection member; and the connection member penetrates the cover at a part of the cover that is substantially perpendicular to the elongating direction of the connection member.

2. The starter of claim 1, wherein the casing of the motor has an opening and the cover of the electromagnetic switch has an opening, and the holding member is fixedly inserted through the opening of the casing of the motor and into the opening of the cover of the electromagnetic switch.

3. The starter of claim 2, wherein the holding member comprises sealing portions tightly sealing the opening of the casing of the motor and into the opening of the cover of the electromagnetic switch, respectively.

4. The starter of claim 3, wherein the sealing portions of the holding member is formed into a double stepwise structure that pinches the casing of the motor.

5. The starter of claim 3, wherein the cover of the electromagnetic switch has an insulating contact seat on which the end part of the connection member providing the second fixed contact is fixedly seated.

6. The starter of claim 3, comprising a housing to which the motor and the electromagnetic switch are attached for unification, wherein a distance between an attachment position where the motor is attached to the housing and the opening of the casing of the motor is substantially equal to, in the predetermined direction, a distance between the attachment position and the opening of the cover of the electromagnetic switch.

7. The starter of claim 2, wherein the connection member is a strip-shaped metal plate.

8. The starter of claim 7, wherein the strip-shaped metal plate is arranged substantially perpendicularly to the predetermined direction.

9. The starter of claim 8, wherein the casing of the motor is substantially cylindrical when viewed along the predetermined direction and the cover of the electromagnetic switch is substantially cylindrical when viewed along the predetermined direction.

10. The starter of claim 9, wherein the opening of the casing is formed at and through a given position of a side wall portion thereof which is along the predetermined direction and the opening of the cover is formed at through a given position of a side wall portion of thereof which is along the predetermined direction, both given positions being decided so that the strip-shaped metal plate is arranged substantially perpendicularly to the predetermined direction.

11. The starter of claim 1, wherein the first fixed contact is eclectically connected to a terminal eclectically connected to a battery mounted in the vehicle.

12. The starter of claim 11, wherein the armature of the motor comprises an armature shaft to be driven for starting the engine in response to supply of current to the armature via the terminal, the first fixed contact, the movable contact, the second fixed contact realized by the connection member, and the brush when the movable contact is made to contact the first and second fixed contacts so as to establish electrical connection therebetween.

13. The starter of claim 1, the electromagnetic switch and the motor being disposed separately and forming separate spaces when assembled.

14. The starter of claim 1, wherein:

the casing encloses the electric motor, including the armature and the brush of the electric motor, within the first space;

the cover encloses the electromagnetic switch, including the first and second fixed contacts, the movable contact and the electromagnet of the electromagnetic switch, within a second space that is separate from the first space;

the connection member penetrates the casing of the motor and the cover of the electromagnetic switch to electrically connect the brush of the motor and the second fixed contact in the electromagnetic switch;

the holding member fixedly holds a portion of the connection member that is between and outside the first and second spaces; and at least one of the first and second fixed contacts is for contacting the motor circuit.

15. A starter for starting an internal combustion engine of a vehicle, comprising:

an electric motor provided with an armature, a brush, and a casing that encloses at least the armature and the brush, current being supplied to the armature via a motor circuit;

an electromagnetic switch provided with first and second fixed contacts, a movable contact, an electromagnet that moves back and forth to the movable contact in a predetermined direction so as to electrically connect and disconnect the first and second fixed contacts, and a cover that covers at least the first and second contacts and the movable contact, the predetermined direction being parallel to a longitudinal direction of the armature of the motor, the electromagnet being provided with only a single coil generating a drive force for moving the movable contact;

an electrically conductive connection member that is arranged to link the motor and the electromagnetic switch through the casing of the motor and the cover of the electromagnetic switch and electrically connects the brush of the motor and the second fixed contact in the electromagnetic switch, the connection member including an end part arranged in the cover of the electromagnetic switch, the end part of the connection member functionally providing the second fixed contact, the single coil has one end portion connected to a terminal which is fixed to the cover of the electromagnetic switch, and an other end portion connected to a grounding side, such that the single coil is electrically separated from the motor circuit; and a holding member that is made of insulating and elastic material and that fixedly holds, between the motor and the electromagnetic switch, the connection member inserted through the holding member and that is inserted through the casing of the motor and the cover of the electromagnetic switch, wherein:

the casing encloses the electric motor, including the armature and the brush of the electric motor, within the first space;

the cover encloses the electromagnetic switch, including the first and second fixed contacts, the movable contact and the electromagnet of the electromagnetic switch, within a second space that is separate from the first space;

the connection member penetrates the casing of the motor and the cover of the electromagnetic switch to electrically connect the brush of the motor and the second fixed contact in the electromagnetic switch;

the holding member fixedly holds a portion of the connection member that is between and outside the first and second spaces; and at least one of the first and second fixed contacts is for contacting the motor circuit.

16. The starter of claim 15, wherein the casing of the motor has an opening and the cover of the electromagnetic switch has an opening, and the holding member is fixedly inserted through the opening of the casing of the motor and into the opening of the cover of the electromagnetic switch.

17. The starter of claim 16, wherein the holding member comprises sealing portions tightly sealing the opening of the casing of the motor and into the opening of the cover of the electromagnetic switch, respectively.

18. The starter of claim 17, wherein the sealing portions of the holding member is formed into a double stepwise structure that pinches the casing of the motor.

19. The starter of claim 17, wherein the cover of the electromagnetic switch has an insulating contact seat on which the end part of the connection member providing the second fixed contact is fixedly seated.

20. The starter of claim 17, comprising a housing to which the motor and the electromagnetic switch are attached for unification, wherein a distance between an attachment position where the motor is attached to the housing and the opening of the casing of the motor is substantially equal to, in the predetermined direction, a distance between the attachment position and the opening of the cover of the electromagnetic switch.

21. The starter of claim 16, wherein the connection member is a strip-shaped metal plate.

22. The starter of claim 21, wherein the strip-shaped metal plate is arranged substantially perpendicularly to the predetermined direction.

23. The starter of claim 22, wherein the casing of the motor is substantially cylindrical when viewed along the predetermined direction and the cover of the electromagnetic switch is substantially cylindrical when viewed along the predetermined direction.

24. The starter of claim 23, wherein the opening of the casing is formed at and through a given position of a side wall portion thereof which is along the predetermined direction and the opening of the cover is formed at through a given position of a side wall portion of thereof which is along the predetermined direction, both given positions being decided so that the strip-shaped metal plate is arranged substantially perpendicularly to the predetermined direction.

25. The starter of claim 15, wherein the first fixed contact is eclectically connected to a terminal eclectically connected to a battery mounted in the vehicle.

26. The starter of claim 25, wherein the armature of the motor comprises an armature shaft to be driven for starting the engine in response to supply of current to the armature via the terminal, the first fixed contact, the movable contact, the second fixed contact realized by the connection member, and the brush when the movable contact is made to contact the first and second fixed contacts so as to establish electrical connection therebetween.

27. The starter of claim 15, the electromagnetic switch and the motor being disposed separately and forming separate spaces when assembled.

* * * * *